June 15, 1971  D. O. BUKER ET AL  3,584,995
VACUUM PURIFICATION OF RED CAKE COMPRISED SUBSTANTIALLY OF $V_2O_5$
Filed April 10, 1969
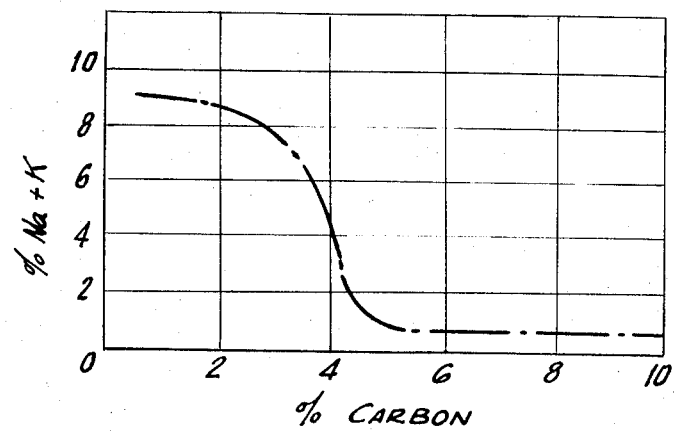
INVENTORS
DONALD O. BUKER
CORNELIUS M. COSMAN
BY
E. J. Kalil +
M. T. Serijan
ATTORNEYS

United States Patent Office 3,584,995
Patented June 15, 1971

3,584,995
VACUUM PURIFICATION OF RED CAKE COMPRISED SUBSTANTIALLY OF $V_2O_5$
Donald O. Buker, Grand Junction, Colo., and Cornelius M. Cosman, Bronxville, N.Y., assignors to American Metal Climax, Inc., New York, N.Y.
Filed Apr. 10, 1969, Ser. No. 815,084
Int. Cl. C22b *59/00;* C01g *31/00*
U.S. Cl. 23—21                      8 Claims

ABSTRACT OF THE DISCLOSURE

A process for purifying red cake comprised substantially of $V_2O_5$ and containing volatilizable impurities is provided wherein the red cake is mixed with carbon and the mixture subjected to heating in vacuum at an elevated temperature above the fusion temperature of $V_2O_5$, for example, about 950° C. or higher, to reduce and remove said volatilizable impurities.

---

This invention relates to a process for the vacuum purification of red cake comprised substantially of $V_2O_5$, and, in particular, to a process for producing relatively pure vanadium suboxide from red cake containing impurities in the combined state capable of being volatized when reduced to the elemental state, for example, sodium, potassium, sulfur, or mixtures thereof, among others, the vanadium suboxide, e.g. $V_2O_4$, $V_2O_3$, or mixtures thereof, having particular use as a product of commerce and in the preparation of commercially useful vanadium products, such as $V_2O_5$, other vanadium oxides, $V_2C$, VC, ferrovanadium, metallic vanadium, and the like.

THE PRIOR ART

It has been recommended to produce purified vanadium pentoxide ($V_2O_5$) by starting with low purity pentoxide recovered from the ore which is converted through a series of steps to ammonium metavanadate. This product can then be dissociated to form purified $V_2O_5$ or further processed into other vanadium products. However, this process is a wet chemical method and has the attendant problems of relatively low vanadium recovery, higher reagent cost, higher initial capital investment, among other problems.

BACKGROUND OF THE INVENTION

Vanadium is generally extracted from its principal ores and byproduct sources by roasting with common salt to sodium vanadate which is then leached out with water. The residue may be leached again with dilute sulfuric acid, yielding a combined extract which, when subjected to precipitation by sulfuric acid in various ways, yields an oxide concentrate referred to as "red cake" by the industry.

Red cake, which is also known commercially as vanadium pentoxide, generally comprises over about 80% $V_2O_5$, although it may carry enough $Na_2O$ and/or $K_2O$ to provide actually sodium and/or potassium hexavanadate. Such concentrates are treated by wet methods as referred to hereinabove to produce a substantially pure product which methods, as have been stated, have certain inherent disadvantages.

The process of the invention overcomes the aforementioned problems by producing from the red cake a purified product at lower production cost and by providing high recoveries of up to about 99% or higher of vanadium. A typical analysis of red cake capable of being treated in accordance with the invention is one containing about 88% $V_2O_5$, 6% $Na_2O$, 4% $K_2O$, 0.9% Fe, 0.1 to 0.4% S and other residuals making up 100%. Generally, the pentoxide content may range from about 84% to 91%.

It would be desirable to provide a more economical process for recovering vanadium from red cake in the form of a usable commercial product, particularly a process which provides high recovery of vanadium at relatively high purity levels.

It is thus the object of this invention to provide a vacuum purification process for treating red cake comprised substantially of vanadium pentoxide.

Another object is to provide a process for producing a substantially pure vanadium-containing end product from red cake having particular use in the preparation of commercially useful vanadium products.

These and other objects will more clearly appear from the following disclosure and the accompanying drawing, wherein the figure shown is a curve illustrating the effect of carbon on the removal of sodium and potassium from red cake.

TECHNICAL DISCLOSURE OF THE INVENTION

Stating it broadly, the invention is directed to a vacuum heating process for purifying red cake comprised substantially of $V_2O_5$ and containing small amounts of sulfur and sodium and potassium oxides as impurities in combined amounts of up to about 16%, e.g. 9 to 16%. The red cake is intimately mixed with carbon in an amount at least sufficient to reduce $V_2O_5$ and to reduce the oxides of sodium, potassium and sulfur, the mixture being thereafter subjected to vacuum purification at an elevated temperature above the fusion temperature of $V_2O_5$, e.g. about 950° C. or above, for a time at least sufficient to chemically reduce the aforementioned impurities and $V_2O_5$, while purging said mixture of the reduced impurities to a combined total amount of below about 1%.

Merely heating the low purity $V_2O_5$ or red cake in vacuum without carbon is not sufficient to purge out the impurities. For example, heating the red cake at 600° C. at vacuums of 1 to 3000 microns, respectively, had substantially little effect on the contained impurities. It was found that the combined use of relatively high temperatures and appropriate amounts of carbon under vacuum to be essential in breaking up the chemical bonds and effect removal of the contaminants. The addition of carbon is advantageous in that it reduces the sodium and potassium oxides and, in addition, reduces the $V_2O_5$. The reduction of $V_2O_5$ to lower oxides generally occurs before the reduction of Na and K compounds. It occurs at relatively low temperatures, and below the fusion point of $V_2O_5$ (690° C.). We find it advantageous to reduce $V_2O_5$ to $V_2O_4$. $V_2O_4$ has a much higher melting point than $V_2O_5$ (1967° C.), which enables the use of higher treating temperatures at below the fusion point, and thereby offers a means of reducing sodium and potassium compounds and of volatilizing these alkali metals as well as sulfur. However, the $V_2O_5$ may be reduced to lower oxides or even to a carbide end product, the main objective of the invention being to purify the vanadium.

As stated above, in order to achieve adequate purging of the contaminants from crude raw materials, the amount of carbon employed is important. For example, in treating red cake containing 3.33% Na and 3.08% K, it was noted that at least 4 or 5% by weight of carbon in the red cake mixture was advantageous in effecting substantial purging of sodium and potassium as follows:

TABLE I

| Test No. | Percent C in mix | Temp., °C | Time at temp. (min) | Vacuum, μ | Product (percent) Na | K |
|---|---|---|---|---|---|---|
| 1 | 2.5 | 1,065 | 30 | 1,000 | 4.60 | 3.50 |
| 2 | 5 | 1,065 | 30 | 1,000 | 0.61 | 0.09 |
| 3 | 10 | 1,065 | 30 | 1,000 | 0.59 | 0.06 |

The apparent increase in the amount of sodium potassium in the end product of Test No. 1 is due to the partial reduction (and hence decrease in weight) of the pentoxide. Referring to the figure of the drawing, it will be noted that substantial reduction (e.g. less than about 1%) in the alkali metals is obtained at carbon contents of over 4% by weight.

Additional tests using 10% by weight of carbon, a vacuum below 3000 microns, e.g. 1000 microns, and temperatures above 925° C., e.g. 1000° C., indicated that a substantially pure vanadium suboxide with a combined total of sodium and potassium of less than 1% could be produced.

As illustrative of the various embodiments of the invention, the following examples are given:

Example 1

Red cake containing about 3.33% Na, 3.07% K, 0.47% S, 0.9% Fe, and substantially the balance $V_2O_5$ was mixed with about 10% by weight of carbon and treated at temperatures ranging from 925° C. to 1100° C. at vacuums of 1, 1000 and 5000 microns.

In preparing the mix, the red cake is screw fed into a drying calciner and from there to a closed hopper at a batch mixing weighing station. At this station, the aforementioned carbon addition is made to red cake and the ingredients making up the mixture blended in a pug mill. The blended ingredients are then fed into a continuous ball mill where additional mixing and grinding occur.

The mix from the ball mill is then conveyed to an external vacuum furnace hopper which is adapted as a vacuum lock. Thus, when the external hopper is full, it is sealed, evacuated and its contents allowed to empty into an internal vacuum furnace hopper from which it is fed onto a vibrating hearth in the vacuum furnace. Batches of the mix were maintained at specified temperatures and vacuums for a given length of time and, at the end of each run, the treated material is vibrated from the hearth into a water cooled internal hopper and from there emptied itno a vacuum lock external hopper. The external hopper feeds a conveying system that empties into a surge hopper which is adapted to supply vanadium suboxide to the plant for further processing.

In accordance with the foregoing procedure, the following heats were produced within and outside the invention:

important if the combined sodium and potassium contents are to be reduced to below 1% in the end product. It is observed that at a vacuum of $5000\mu$, the partial pressure of oxygen in the system is not low enough to effect substantial removal of the alkali metals, even when 10% by weight of carbon is present in the mix.

As has been stated hereinbefore, the purified end product, which is preferably $V_2O_4$, has particular use as a starting material in the production of other commercially useful vanadium products. However, the end product need not be $V_2O_4$, since, by controlling the amount of carbon in the mix, it is possible to reduce and purify the red cake to any desired end product, such as $V_2O_3$, vanadium carbide, etc.

However, we prefer to produce a purified end product of substantially $V_2O_4$ in that it makes an excellent starting material for the production of purified $V_2O_5$ or for reduction processes since it saves 20% of reduction work. Moreover, it is a stable high melting compound as distinct from $V_2O_3$ on the one hand and $V_2O_5$ on the other. As illustrative of the production of purified $V_2O_5$, the following example is given.

Example 2

A batch of vanadium suboxide produced in accordance with Heat No. 3 of Example 1 was subjected to oxidation in a muffle furnace with a stream of preheated air flowing over the batch for 30 minutes at a temperature of 700° C. The purified red cake which had an analysis of 0.56% Na and 0.06% K was converted to $V_2O_5$ having an an analysis of 0.22% Na and 0.06% K.

In producing $V_2C$ from the vanadium suboxide, at least a stoichiometric amount of carbon is added to reduce the suboxide to $V_2C$, the temperature employed being at least about 1200° C. at a vacuum below 3000 microns of mercury.

In carrying out the primary step of purifying the low purity red cake, the amount of carbon to be added to the desired suboxide or suboxide mixtures should preferably be related to the $V_2O_5$ content of the red cake. Generally, for impure red cake containing about 86 to 88% $V_2O_5$, the carbon content may range from about 4% to 14% by weight of the mixture, this ratio providing enough carbon for the reduction of impurities in the raw material. However, we find it more suitable to

TABLE 2

| | Temp., °C. | Time at temp. (min.) | Vacuum, $\mu$ | Product (percent) | | | |
|---|---|---|---|---|---|---|---|
| | | | | Na | K | S | Na+K |
| Heat No.: | | | | | | | |
| 1 | 980 | 30 | 1 | 0.69 | 0.12 | 0.008 | 0.81 |
| 2 | 980 | 30 | 1,000 | 0.88 | 0.083 | 0.003 | 0.96 |
| 3 | 1,000 | 30 | 1 | 0.56 | 0.062 | ¹N.D. | 0.62 |
| 4 | 1,040 | 30 | 1 | 0.47 | 0.058 | N.D. | 0.53 |
| 5 | 1,040 | 30 | 1 | 0.52 | 0.058 | N.D. | 0.58 |
| 6 | 1,040 | 30 | 1,000 | 0.62 | 0.062 | N.D. | 0.68 |
| 7 | 1,065 | 30 | 1 | 0.52 | 0.058 | N.D. | 0.58 |
| 8 | 1,065 | 30 | 1,000 | 0.59 | 0.06 | 0.003 | 0.65 |
| 9 | 1,100 | 30 | 1 | 0.54 | 0.13 | N.D. | 0.67 |
| 10 | 1,100 | 30 | 1,000 | 0.44 | 0.06 | N.D. | 0.50 |
| 1A | 925 | 30 | 1 | 2.14 | 1.33 | N.D. | 3.47 |
| 2A | 980 | 10 | 1 | 1.63 | 0.08 | 0.015 | 1.71 |
| 3A | 980 | 30 | 5,000 | 3.40 | 2.41 | N.D. | 5.81 |
| 4A | 1,040 | 30 | 5,000 | 2.04 | 1.49 | N.D. | 3.53 |
| 5A | 1,100 | 30 | 5,000 | 2.04 | 1.66 | N.D. | 3.80 |

¹ Not detected by wet methods.

As will be noted from Heat Nos. 1 to 10 of Table 2, so long as the temperature is maintained above 925° C. (e.g. 980° C. and above) and the vacuum maintained below $3000\mu$ for example, $1000\mu$ or below, and so long as the red cake mixture is heated for a sufficient time, the sulfur can be substantially completely removed and the combined sodium and potassium contents can be decreased to below 1%. It will be additionally noted from Heat Nos. 1A to 5A, outside the scope of the invention that time, that temperature and the degree of vacuum are relate the carbon to the $V_2O_5$ on the mole basis. Thus, stating it broadly, the amount of carbon added to the red cake may range from about 0.65 to 2.7 moles per mole of $V_2O_5$. For our purposes, we find it advantageous to work over the range of 1 to 2.5 moles of carbon per mole of contained $V_2O_5$.

Although the present invention has been described in conjunction with preferred embodiments, it is to be understood that modifications and variations may be resorted to without departing from the spirit and scope of the

What is claimed is:

1. A process for producing a purified vanadium-containing end product from red cake comprised substantially of $V_2O_5$ and containing as impurities at least one element from the group consisting of sodium, potassium and sulfur in the oxidized state in combined amounts ranging up to about 16% by weight which comprises, forming a mixture of said red cake and carbon, the amount of carbon added to said red cake being sufficient to reduce said $V_2O_5$ to vanadium suboxide and reduce said impurities to a volatilizable state, and subjecting said mixture to vacuum purification at an elevated temperature above the melting point of $V_2O_5$ at a partial pressure of oxygen low enough to assure substantial removal of impurities for a time at least sufficient to reduce $V_2O_5$ to vanadium suboxide and to reduce said impurities, said impurities being removed in the elemental state by volatilization to a combined total not exceeding about 1%.

2. The process of claim 1, wherein the purification temperature is maintained above 950° C. and wherein the vacuum is maintained below 3000 microns of mercury.

3. The process of claim 2, wherein the temperature is at least about 1000° C. and wherein the vacuum does not exceed about 1000 microns.

4. The process of claim 2, wherein the amount of carbon added to the red cake is at least substantially stoichiometrically sufficient to reduce the $V_2O_5$ to $V_2O_4$.

5. The process of claim 4, wherein the amount of carbon added to the red cake ranges from about 0.65 to 2.7 moles per mole of contained $V_2O_5$.

6. The process of claim 4, wherein the amount of carbon added to the red cake ranges from about 1 to 2.5 moles per mole of contained $V_2O_5$.

7. The process of claim 1, including the additional step of taking the vanadium suboxide formed and oxidizing it to $V_2O_5$.

8. The process of claim 1, including the additional steps of taking the vanadium suboxide formed and mixing at least a substantially stoichiometric amount of carbon with it to reduce the suboxide to $V_2C$, and then heating said mixture at a temperature of at least about 1200° C. in a vacuum below 3000 microns of mercury.

References Cited

UNITED STATES PATENTS

| | | | |
|---|---|---|---|
| 3,087,786 | 4/1963 | Schoder | 23—140 |
| 3,206,277 | 9/1965 | Burwell et al. | 23—140X |
| 3,342,553 | 9/1967 | Buker et al. | 23—208 |

FOREIGN PATENTS

| | | | |
|---|---|---|---|
| 1,546,028 | 19/1968 | France | 23—140 |

HERBERT T. CARTER, Primary Examiner

U.S. Cl. X.R.

23—140, 208